(12) United States Patent
Yoon et al.

(10) Patent No.: US 10,402,036 B2
(45) Date of Patent: Sep. 3, 2019

(54) ELECTRONIC DEVICE AND OPERATION METHOD THEREOF

(71) Applicant: Samsung Electronics Co., Ltd., Gyeonggi-do (KR)

(72) Inventors: Sung-Jin Yoon, Gyeonggi-do (KR); Jong-Won Lee, Seoul (KR); Min-Gu Cho, Gyeonggi-do (KR); Young-Jae Meen, Seoul (KR); Jeong-Hyun Pang, Gyeonggi-do (KR); Geon-Soo Kim, Gyeonggi-do (KR); Min-Kyung Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 255 days.

(21) Appl. No.: 14/955,810

(22) Filed: Dec. 1, 2015

(65) Prior Publication Data

US 2016/0154540 A1 Jun. 2, 2016

(30) Foreign Application Priority Data

Dec. 1, 2014 (KR) .................. 10-2014-0170079

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01); *G06F 3/04817* (2013.01); *G06F 3/04886* (2013.01)

(58) Field of Classification Search
CPC .............................. G06F 1/1694; G06F 3/0481
USPC .................................. 715/763–765, 773, 740
See application file for complete search history.

(56) References Cited

U.S. PATENT DOCUMENTS

| | | | |
|---|---|---|---|
| 2007/0252822 A1 | 11/2007 | Kim et al. | |
| 2008/0158189 A1 | 7/2008 | Kim | |
| 2010/0022276 A1 | 1/2010 | Park et al. | |
| 2010/0057235 A1* | 3/2010 | Wang | G06F 1/1626 700/94 |
| 2012/0176403 A1* | 7/2012 | Cha | G06F 1/1694 345/619 |
| 2012/0278750 A1* | 11/2012 | Abraham | G06F 9/451 715/779 |
| 2013/0073988 A1* | 3/2013 | Groten | G06Q 30/02 715/753 |
| 2014/0317500 A1* | 10/2014 | Kim | G06F 3/0481 715/702 |
| 2015/0264169 A1* | 9/2015 | Yim | H04M 1/72563 455/411 |

(Continued)

FOREIGN PATENT DOCUMENTS

| | | |
|---|---|---|
| KR | 1020070106888 | 11/2007 |
| KR | 100831721 | 5/2008 |
| KR | 1020100010297 | 2/2010 |

*Primary Examiner* — Cao H Nguyen
(74) *Attorney, Agent, or Firm* — The Farrell Law Firm, P.C.

(57) ABSTRACT

An electronic device and a method thereof are provided. The electronic device is configured to display a first window including a first set of at least one icon on a background screen, and detect a first movement request in a first direction move, according to the first movement request, the first window in the first direction in the background screen and add and display a second window including a second set of at least one icon on the background screen.

20 Claims, 17 Drawing Sheets

(56) References Cited

U.S. PATENT DOCUMENTS

2016/0188197 A1\* 6/2016 Ryu .................... G06F 3/04883
345/156

\* cited by examiner

ELECTRONIC DEVICE AND OPERATION METHOD THEREOF

PRIORITY

The present application claims priority under 35 U.S.C. § 119(a) to Korean Patent Application Serial No. 10-2014-0170079, which was filed in the Korean Intellectual Property Office on Dec. 1, 2014, the entire content of which is incorporated herein by reference.

BACKGROUND

1. Technical Field

The present disclosure relates generally to an electronic device, and more particularly, to an electronic device and a method thereof for displaying windows and icons.

2. Description of the Related Art

Electronic devices support various functions to provide various services to users. An electronic device may store a plurality of icons that may correspond to one or more of these various functions. An electronic device may display the icons. When one of the displayed icons is selected, the electronic device may perform at least one of the functions corresponding to the icon.

A user of an electronic device described above may have difficulty in selecting a desired icon. More specifically, a user may have difficulty in remembering the locations of individual icons, due to the manner in which icons are arranged in the electronic device.

SUMMARY

An aspect of the present disclosure is to address at least the above-mentioned problems and/or disadvantages and to provide at least the advantages described below. Accordingly, an aspect of the present disclosure provides a screen display apparatus that allows a user of an electronic device to easily access an icon that the user desires, and a method thereof.

According to an aspect of the present disclosure, a method of an electronic device includes displaying a first window including a first set of at least one icon on a background screen; detecting a first movement request in a first direction; and moving, according to the first movement request, the first window in the first direction in the background screen and adding and displaying a second window including a second set of at least one icon on the background screen.

According to another aspect of the present disclosure, an electronic device include: a display unit configured to display a background screen; and a control unit operatively connected to the display unit, wherein the control unit is configured to display a first window including a first set of at least one icon on the background screen, detect a first movement request in a first direction, and move, according to the movement request in the first direction, the first window in the one direction in the background screen and add and display a second window including a second set of at least one icon on the background screen.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
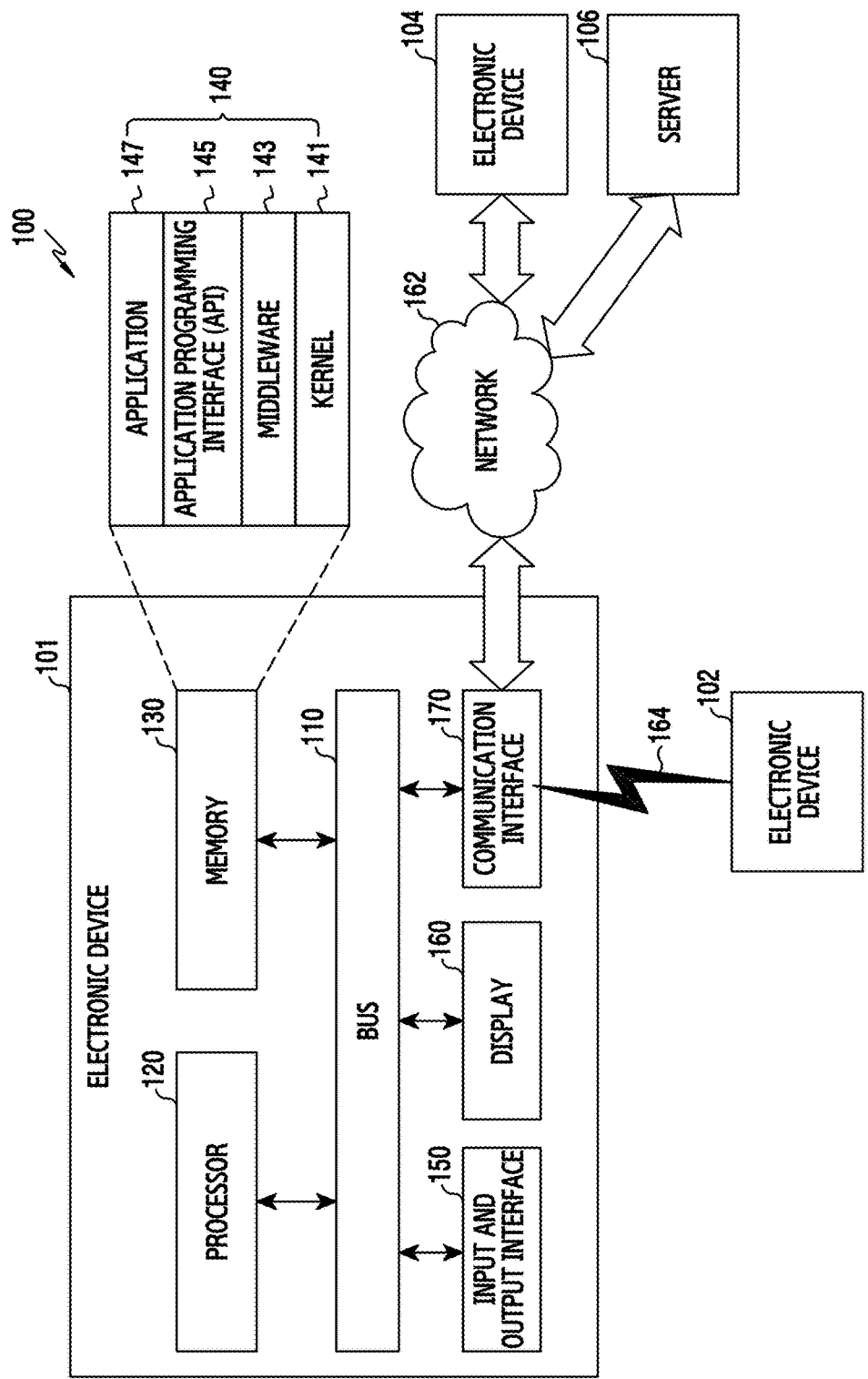
FIG. 1 is a diagram illustrating a network environment including an electronic device according to various embodiments.

Embodiments of the present disclosure are described herein below with reference to the accompanying drawings. However, embodiments of the present disclosure are not limited to the specific embodiments, and should be construed as including all modifications, equivalents, substitutes, and/or alternatives included in the ideas and technological scopes of embodiments of the present disclosure. In the explanation of the drawings, similar reference numerals may be used to refer to the same or similar elements.

The terms "have," "may have," "include," and "may include", as used herein, indicate the presence of corresponding features (for example, elements such as numerical values, functions, operations, or parts), but do not preclude the presence of additional features.

Terms such as "A or B," "at least one of A or/and B," and "one or more of A or/and B", as used herein, include all possible combinations of items enumerated with them. For example, "A or B," "at least one of A and B," and "at least one of A or B" refer to combinations (1) including at least one A, (2) including at least one B, or (3) including both at least one A and at least one B.

The terms such as "first" and "second", as used herein, may modify various elements regardless of an order and/or importance of the corresponding elements, and does not limit the corresponding elements. These terms may be used to distinguish one element from another element. For example, a first user device and a second user device may indicate different user devices, regardless of the order or importance of these devices. For example, a first element may be referred to as a second element, and similarly, a second element may be referred to as a first element, without departing from the scope of right of various embodiments of the present invention.

When an element is described as being "(operatively or communicatively) coupled with/to" or "connected to" another element (for example, a second element), the element may be directly coupled with/to another element, and there may be an intervening element (between the element and the other element. By contrast, when an element is "directly coupled with/to" or "directly connected to" another element, there is no intervening element between the element and the other element.

The expression "configured to (or set to)", as used herein, may be replaced with the expressions "suitable for," "having the capacity to," "designed to," "adapted to," "made to," or "capable of", according to a context of use of the expression. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may refer to a dedicated processor (e.g., an embedded processor) for performing a corresponding operation, or a generic-purpose processor (e.g., a CPU or an application processor) capable of performing a corresponding operation by executing one or more software programs stored in a memory device.

Terms used herein with respect to various embodiments of the present disclosure are merely used to describe particular embodiments and are not intended to limit the present disclosure. Herein, the singular forms of terms are intended to include the plural forms as well, unless the context clearly indicates otherwise. All of the terms used herein, including technical or scientific terms, have the same meanings as those generally understood by an ordinary skilled person in the related art unless they are defined otherwise. The terms defined in a generally used dictionary should be interpreted as having the same or similar definitions as in the dictionary or the same or similar to the contextual definitions of the relevant technology. Such terms should not be interpreted as having ideal or exaggerated definitions, unless they are clearly defined in the various embodiments of the present disclosure. According to circumstances, even terms defined herein with respect to embodiments of the present disclosure should not be interpreted as excluding other embodiments of the present disclosure.

An electronic device according to various embodiments of the present disclosure may include, for example, at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a Motion Picture Experts Group (MPEG) audio layer-3 (MP3) player, a mobile medical machine, a camera, or a wearable device (for example, smart glasses, a head-mounted-device (HMD), electronic clothing, an electronic bracelet, an electronic necklace, an electronic appcessory, electronic tattoos, a smart mirror, or a smart watch).

According to embodiments, the electronic device may be a smart home appliance. For example, the smart home appliance may include at least one of a television, a digital versatile disk (DVD) player, a stereo, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Goggle TV™), a game console (for example, Xbox™, or PlayStation™), an electronic dictionary, an electronic key, a camcorder, or an electronic album.

According to another embodiment of the present disclosure, the electronic device may include, for example, various medical machines (for example, various portable medical measurement devices (a glucose monitor, a heart rate monitor, a blood pressure measuring device, or a thermometer), magnetic resonance angiography (MRA), magnetic resonance imaging (MRI), computerized tomography (CT), a tomograph, an ultrasound machine, etc.), a navigation device, a global positioning system (GPS) receiver, an event data recorder (EDR), a flight data recorder (FDR), an automotive infotainment device, electronic equipment for ship (for example, a navigation equipment for ship, a gyro compass, etc.), avionics, a security device, a head unit for vehicles, an industrial or home robot, an automatic teller machine (ATM) of a financial institution, point of sales (POS) of a store, or Internet of Things (for example, a lamp, various sensors, an electric or gas meter, a sprinkler, a fire alarm, a thermostat, a streetlamp, a toaster, an exercising machine, a hot water tank, a heater, a boiler, etc.).

According to an embodiment of the present disclosure, the electronic device may include at least one of a part of furniture or a building/a structure, an electronic board, an electronic signature receiving device, a projector, and various measurement devices (for example, devices for measuring water, power, gas, radio waves, etc.). The electronic device according to various embodiments may be one or a combination of one or more of the above-mentioned devices. In addition, the electronic device according to various embodiments may be a flexible electronic device. In addition, the electronic device according to various embodiments is not limited to the above-mentioned devices, and may include a new electronic device accompanied by technology development.

Hereinafter, electronic devices according to various embodiments are described with reference to the accompanying drawings. The term "user", as used herein, may refer to a person who uses the electronic device or a device that uses the electronic device (for example, an artificial intelligence electronic device).

FIG. 1 is a diagram illustrating a network environment including an electronic device according to various embodiments of the present disclosure.

Referring to FIG. 1, an electronic device 101 is included in a network environment 100. The electronic device 101 includes a bus 110, a processor 120, a memory 130, an input and output interface 150, a display 160, and a communication interface 170. According to alternative embodiments of the present disclosure, the electronic device 101 may omit at least one of the elements illustrated in FIG. 1, or may include other additional elements.

The bus 110 may include a circuit that connects the elements 110-170 with one another and transmits communications (for example, a control message and/or data) between the elements.

The processor 120 may include one or more of a central processing unit (CPU), an application processor (AP), or a communication processor (CP). The processor 120 may execute calculation or data processing related to control and/or communication of at least one other element of the electronic device 101.

The memory 130 may include a volatile and/or non-volatile memory. For example, the memory 130 may store instructions or data related to at least one other element of the electronic device 101. According to an embodiment of the present disclosure, the memory 130 may store software and/or a program 140. The program 140 includes, for example, a kernel 141, middleware 143, an application programming interface (API) 145, and/or an application program (or an application) 147, etc. At least some of the kernel 141, the middleware 143, or the API 145 may be referred to as an operating system (OS).

For example, the kernel 141 may control or manage system resources (for example, the bus 110, the processor 120, the memory 130, etc.) which are used for performing operations or functions implemented in the other programs (for example, the middleware 143, the API 145, or the application 147). In addition, the kernel 141 may provide an interface for allowing the middleware 143, the API 145, or the application program 147 to access an individual element of the electronic device 101 and control or manage the system resources.

For example, the middleware 143 may serve as an intermediary to allow the API 145 or the application program 147 to communicate with the kernel 141 and exchange data with the kernel 141.

In addition, the middleware 143 may process one or more operation requests received from the application program 147 according to priority. For example, the middleware 143 may give priority to use the system resources of the electronic device 101 (for example, the bus 110, the processor 120, the memory 130, etc.) to at least one of the application programs 147. For example, the middleware 143 may perform scheduling or load balancing with respect to the one or more operation requests by processing the one or more operation requests according to the priority given to the at least one application program.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

The input and output interface 150 may serve as an interface for transmitting instructions or data inputted from a user or another external device to other element(s) of the electronic device 101. In addition, the input and output interface 150 may output instructions or data received from other element(s) of the electronic device 101 to the user or another external device.

The display 160 may include, for example, a liquid crystal display (LCD), a light emitting diode (LED) display, an organic light emitting diode (OLED) display, or a microelectromechanical system (MEMS) display, or an electronic paper display. The display 160 may display various contents (for example, a text, an image, a video, an icon, a symbol, etc.) for the user. The display 160 may include a touch screen. The touch screen may receive input of a touch using, for example, an electronic pen or a part of a user's body, a gesture, approach, or hovering.

The communication interface 170 may establish communication between the electronic device 101 and an external device (e.g., a first external electronic device 102, a second external electronic device 104, or a server 106). The communication interface 170 may be connected to a network 162 via wireless communication or wired communication to communicate with the external device (e.g., the second external electronic device 104, or the server 106).

The wireless communication may use a cellular communication protocol, such as long term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM), etc. The wireless communication may also include short-distance communication 164. For example, the short-distance communication 164 may include, for example, wireless fidelity (WiFi), Bluetooth, near field communication (NFC), GPS, etc. The wired communication may include, for example, communication performed via a universal serial bus (USB), a high definition multimedia interface (HDMI), a recommended standard 232 (RS-232), or a plain old telephone service (POTS). The network 162 may include a telecommunications network, for example, at least one of a computer network (for example, a LAN or WAN), Internet, or a telephone network.

Each of the first external electronic device 102 and the second external electronic device 104 may be the same kind of electronic device as the electronic device 101 or a different kind of device. According to an embodiment of the present disclosure, the server 106 may include a group of one or more servers. According to various embodiments, some or all of the operations executed in the electronic device 101 may be executed in another electronic device or a plurality of other electronic devices (for example, the electronic devices 102, 104 or the server 106). According to an embodiment of the present disclosure, when the electronic device 101 should perform a certain function or service automatically or in response to a request, the electronic device 101 may request another device (for example, the electronic devices 102, 104 or the server 106) to perform at least some function related to the certain function or service additionally or instead of executing the function or service by itself. Another electronic device (for example, the electronic devices 102, 104 or the server 106) may execute the requested function or additional function, and transmit the result to the electronic device 101. The electronic device 101 may process the received result as it is or in addition to another received or internally generated result, and provide the requested function or service. To achieve this, cloud computing, distributed computing, or client-server computing technology may be used, for example.

Figure 2:
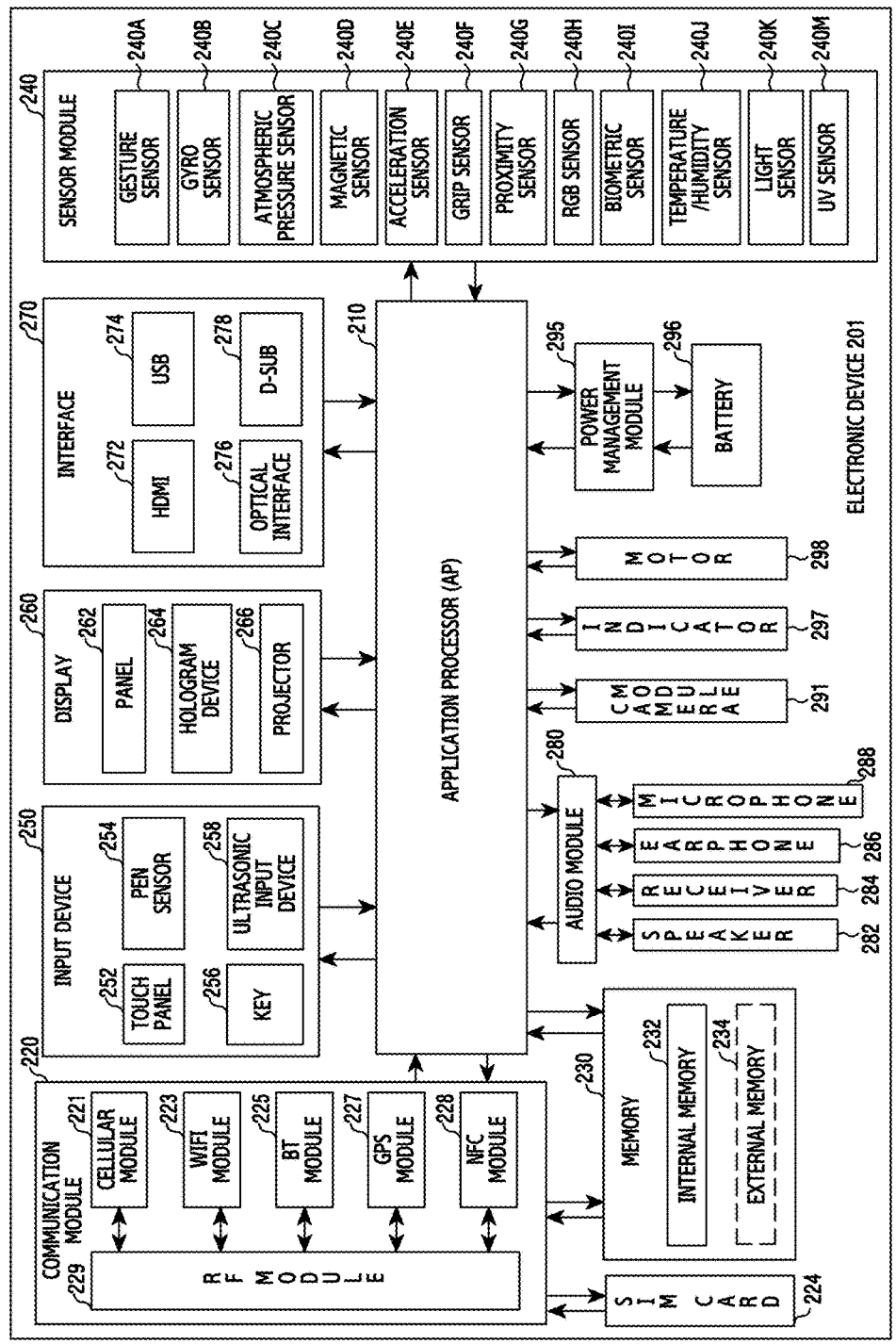
FIG. 2 is a block diagram illustrating an electronic device according to various embodiments.

FIG. 2 is a block diagram illustrating an electronic device 201 according to various embodiments of the present disclosure. For example, the electronic device 201 may include all or a part of the electronic device 101 shown in FIG. 1.

Referring to FIG. 2, the electronic device 201 includes, for example, one or more processors 210 (for example, an application processor (AP)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an operating system or an application program, and may process and calculate various data. For example, the processor 210 may be implemented by using a System on Chip (SoC). According to an embodiment of the present disclosure, the processor 210 may further include a Graphic Processing Unit (GPU) and/or an image signal processor. The processor 210 may include a part of other elements shown in FIG. 2 (for example, the cellular module 221). The processor 210 may load instructions or data received from at least one of the other elements (for example, a non-volatile memory) into a volatile memory and process the instructions or data, and may store various data in the non-volatile memory.

The communication module 220 may have a same or similar configuration as or to that of the communication interface 170 of FIG. 1. The communication module 220 includes, for example, the cellular module 221, a WiFi module 223, a Bluetooth (BT) module 225, a global positioning system (GPS) module 227, a near field communication (NFC) module 228, and a Radio Frequency (RF) module 229.

The cellular module 221 may provide a voice call, a video call, a text service, or an internet service through a telecommunications network. According to an embodiment of the present disclosure, the cellular module 221 may identify and authenticate the electronic device 201 in the telecommunications network by using the subscriber identification module 224 (for example, an SIM card). According to an embodiment of the present disclosure, the cellular module 221 may perform at least some of the functions provided by the processor 210. According to an embodiment of the present disclosure, the cellular module 221 may include a communication processor (CP).

The WiFi module 223, the BT module 225, the GPS module 227, or the NFC module 228 each may include a processor for processing data received and transmitted through a corresponding module. According to an embodiment of the present disclosure, two or more of the cellular module 221, the WiFi module 223, the BT module 225, the GPS module 227, and the NFC module 228 may be included in a single integrated chip (IC) or a single IC package.

The RF module 229 may transmit and receive communication signals (for example, an RF signal). For example, the RF module 229 may include a transceiver, a Power Amp Module (PAM), a frequency filter, a Low Noise Amplifier (LNA), an antenna, etc. According to another embodiment of the present disclosure, one or more of the cellular module 221, the WiFi module 223, the BT module 225, the GPS module 227, or the NFC module 228 may transmit and receive an RF signal through a separate RF module.

The subscriber identification module 224 may be included in a card and/or included in an embedded SIM, and may include its unique identification information (for example, an Integrated Circuit Card Identifier (ICCID)) or subscriber information (for example, International Mobile Subscriber Identity (IMSI)).

The memory 230 includes, for example, an internal memory 232 and an external memory 234. For example, the internal memory 232 may include at least one of a volatile memory, such as, a Dynamic Random Access Memory (DRAM), a Static Random Access Memory (SRAM), a Synchronous DRAM (SDRAM), etc.) and a non-volatile memory, such as, a One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a flash memory (for example, a NAND flash memory, a NOR flash memory, etc.), a hard drive, a solid state drive (SSD), etc.

The external memory 234 may further include, for example, a flash drive, for example, Compact Flash (CF), Secure Digital (SD), Micro-SD, Mini-SD, extreme-Digital (xD), a Multi Media Card (MMC), memory stick, etc. The external memory 234 may be functionally and/or physically connected with the electronic device 201 through various interfaces.

The sensor module 240 may measure a physical quantity or detect an operation state of the electronic device 201, and may convert measured or detected information into electric signals. The sensor module 240 includes, for example, a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, Blue (RGB) sensor 240H, a biometric sensor 240I, a temperature/humidity sensor 240J, a light sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared ray (IR) sensor, an iris sensor, and/or a fingerprint sensor, etc. The sensor module 240 may further include a control circuit to control at least one sensor included therein. According to an embodiment of the present disclosure, the electronic device 201 may further include a processor configured to control the sensor module 240 as a part of the processor 210 or a separate part, and may control the sensor module 240 while the processor 210 is in a sleep state.

The input device 250 includes, for example, a touch panel 252, a (digital) pen sensor 254, a key 256, and an ultrasonic input device 258. The touch panel 252 may use at least one of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 may detect ultrasonic waves generated in an input tool through the microphone 288, and identify data corresponding to the detected ultrasonic waves.

The display 260 includes, for example, a panel 262, a hologram device 264, and a projector 266. The panel 262 may have a same or similar configuration as or to that of the display 160 of FIG. 1. For example, the panel 262 may be flexible, transparent, or wearable. The panel 262 may be configured as a single module along with the touch panel 252. The hologram device 264 may show a stereoscopic image in the air using interference of light. The projector 266 may display an image by projecting light onto a screen. The screen may be located inside or outside the electronic device 201. According to an embodiment of the present disclosure, the display 260 may further include a control circuit to control the panel 262, the hologram device 264, or the projector 266.

The interface 270 includes, for example, an HDMI interface 272, a USB interface 274, an optical interface 276, and a d-subminiature (D-sub) interface 278. The interface 270 may be included in the communication interface 170 shown in FIG. 1. Additionally or alternatively, the interface 270 may include a mobile high definition link (MHL) interface, a secure digital (SD) card/multimedia card (MMC) interface or Infrared Data Association (IrDA) standard interface.

The audio module 280 may convert a sound and an electric signal bidirectionally. For example, at least some elements of the audio module 280 may be included in the input and output interface 150 shown in FIG. 1. The audio module 280 may process sound information that is input or output through a speaker 282, a receiver 284, an earphone 286, or a microphone 288.

The camera module 291 photographs still images and moving images (i.e., video), and, according to an embodiment of the present disclosure, the camera module 291 may include one or more image sensors (for example, a front surface sensor or a rear surface sensor), a lens, an Image Signal Processor (ISP), or a flash (for example, a light emitting diode (LED), or a xenon lamp).

The power management module 295 may manage power of the electronic device 201. According to an embodiment of the present disclosure, the power management module 295 may include a power management IC (PMIC), a charger IC, a battery gauge, or a fuel gauge. For example, the PMIC may implement a wired charging method and/or a wireless charging method. The wireless charging method may include a magnetic resonance method, a magnetic induction method, or an electromagnetic wave method, and an additional circuit for wireless charging, for example, a coil loop, a resonant circuit, a rectifier, etc. may be added. For example, the battery gauge may measure a remaining battery life of the battery 296, a voltage, a current, or temperature during charging. The battery 296 may include a rechargeable battery and/or a solar battery.

The indicator 297 may display a specific state of the electronic device 201 or a state of a part of the electronic device 210 (for example, the processor 210). The states may include, for example, a booting state, a message state, or a charging state. The motor 298 may convert an electric signal into a mechanical vibration, and cause a vibration or haptic effect. Although not shown, the electronic device 201 may include a processing device (for example, a GPU) for supporting a mobile TV. The processing device for supporting the mobile TV may process media data according to standards such as digital multimedia broadcasting (DMB), digital video broadcasting (DVB), or media flow.

Each of the above-described elements of the electronic device according to various embodiments of the present disclosure may include one or more components, and the names of the elements may vary according to the type of electronic device. Electronic devices according to various embodiments may include one or more of the above-described elements, and some of the elements may be omitted or additional elements may be further included. In addition, some of the elements of an electronic device according to various embodiments may be combined into a single entity, and may perform the same functions as those of the elements before being combined.

Figure 3:
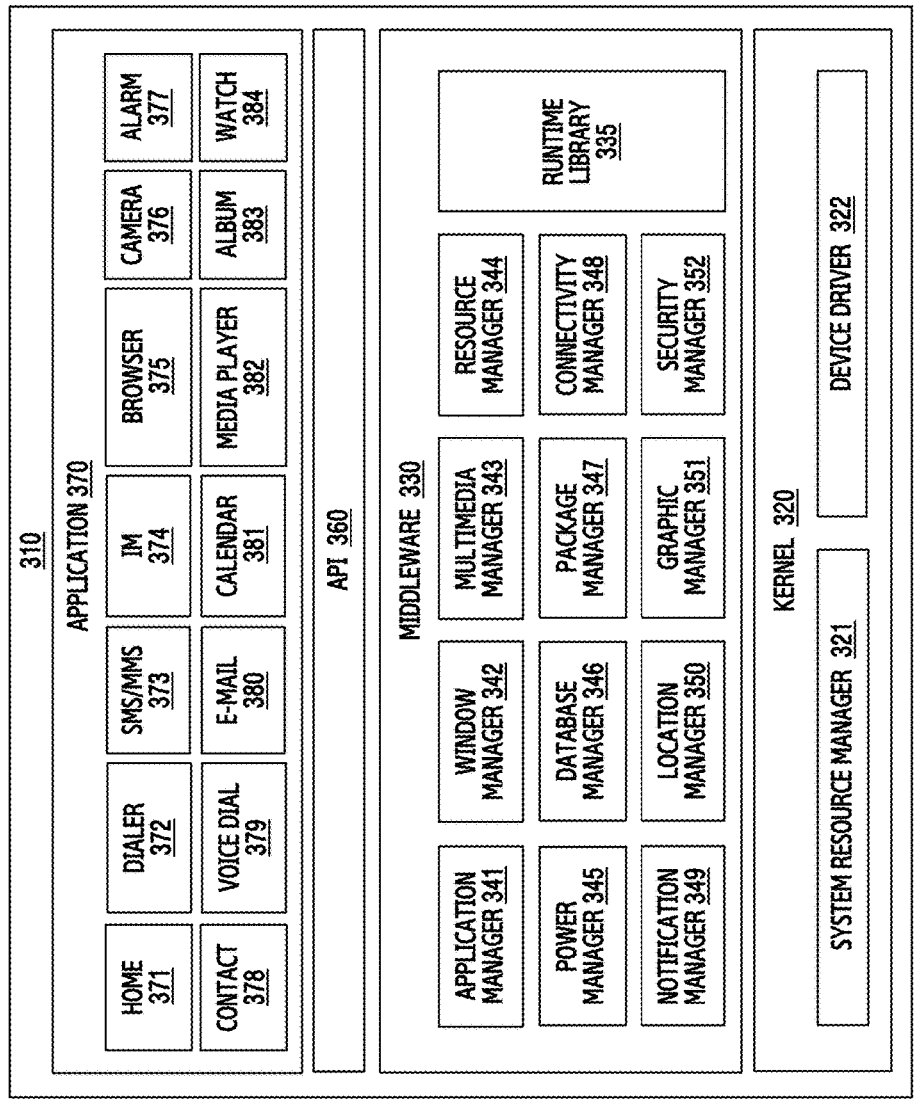
FIG. 3 is a block diagram illustrating a program module according to various embodiments.

FIG. 3 is a block diagram illustrating a program module according to various embodiments of the present disclosure. According to an embodiment of the present disclosure, the program module 310 may include an Operating System (OS) for controlling resources related to an electronic device and/or various applications driven on the OS. The OS may be Android, iOS, Windows, Symbian, Tizen, Bada, etc.

Referring to FIG. 3, the program module 310 includes, for example, a kernel 320, middleware 330, an application programming interface (API) 360, and/or an application 370. At least part of the program module 310 may be preloaded on the electronic device or downloaded from an external device (for example, the electronic device 102, 104, the server 106, etc.).

The kernel 320 includes, for example, a system resource manager 321 and/or a device driver 323. The system resource manager 321 may control, allocate or collect the system resources. According to an embodiment of the present disclosure, the system resource manager 321 may include a process manager, a memory manager, a file system manager, etc. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions which are commonly required by the application 370 or may provide various functions to the application 370 through the API 360 such that the application 370 can effectively use limited system resources in the electronic device. According to an embodiment of the present disclosure, the middleware 330 includes, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module which is used by a compiler to add a new function through a programming language while the application 370 is executed. The runtime library 335 may perform functions on input/output management, memory management, an arithmetic function, etc.

The application manager 341 may manage a life cycle of at least one of the applications 370, for example. The window manager 342 may manage GUI resources used in a screen. The multimedia manager 343 identifies a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a basic input/output system (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connections based on WiFi, Bluetooth, etc. The notification manager 349 may display or notify an event, such as a message arrived, an appointment, a notification of proximity in such a manner that the event notification does not hinder the user. The location manager 350 may manage location information of the electronic device. The graphic manager 350 may manage a graphic effect to be provided to the user or a relevant user interface. Herein, the graphic manager 351 may include a Dali graphic engine. The security manager 352 may provide an overall security function necessary for system security or user authentication. According to an embodiment of the present disclosure, when the electronic device is equipped with a telephony function, the middleware 330 may further include a telephony manager to manage a speech or video telephony function of the electronic device.

The middleware 330 may include a middleware module to form a combination of the various functions of the above-described elements. The middleware 330 may provide a module which is customized according to a kind of OS to provide a distinct function. In addition, the middleware 330 may dynamically delete some of the existing elements or may add new elements.

The API 360 is a set of API programming functions and may be provided as a different configuration according to an OS. For example, in the case of Android or iOS, a single API set may be provided for each platform. When the electronic device runs Tizen, two or more API sets may be provided for each platform.

The application 370 includes, for example, applications for providing functions, such as a home 371, a dialer 372, a short message service (SMS)/multimedia messaging service (MMS) 373, an instant message (IM) 374, a browser 375, a camera 376, an alarm 377, contacts 378, a voice dial 379, an email 380, a calendar 381, a media player 382, an album 383, or a clock 384, or health care (for example, measuring exercise or a blood sugar), or providing environment information (for example, information on atmospheric pressure, humidity, or temperature), for example.

According to an embodiment of the present disclosure, the application 370 may include an application for supporting information exchange between the electronic device and an external electronic device (hereinafter, referred to as an "information exchange application" for the convenience of explanation). The information exchange application may include a notification relay application for relaying specific information to an external electronic device or a device management application for managing an external electronic device.

The notification relay application may include, for example, a function of relaying notification information generated by other applications of the electronic device (for example, the SMS/MMS application, the email application, the health care application, the environment information application, etc.) to an external electronic device. In addition, the notification relay application may receive notification information from an external electronic device and may relay the same to the user.

The device management application may manage (for example, install, delete or update), for example, at least one function of an external electronic device communicating with the electronic device (for example, turning on/off an external electronic device (or some parts) or adjusting brightness (or resolution) of a display), an application operating in the external electronic device or a service provided by the external electronic device (for example, a calling service or a message service).

According to an embodiment of the present disclosure, the application 370 may include an application (for example, a health care application of a mobile medical device) that is specified according to the attribute of the external electronic device. According to an embodiment of the present disclosure, the application 370 may include an application received from an external electronic device). According to an embodiment of the present disclosure, the application 370 may include a preloaded application or a third party application that may be downloaded from a server. The names of the elements of the program module 310 according to the illustrated embodiments may be changed according to a kind of OS.

According to various embodiments, at least part of the program module 310 may implemented by using software, firmware, hardware, or a combination of two or more thereof. At least part of the program module 310 may be implemented (for example, executed) by a processor. At least part of the program module 310 may include a module, a program, a routine, sets of instructions, or a process to perform one or more functions, for example.

The term "module", as used herein, refers to a unit including hardware, software, and firmware, or a combination of two or more thereof, for example. For example, the term "module" may be used interchangeably with terms like "unit", "logic", "logical block", "component," or "circuit". A module may be a minimum unit of an integrally configured part or a part of the integrally configured part. A module may be a minimum unit that performs all or a part of one or more functions. A module may be implemented mechanically or electronically. For example, a module may include at least one of an application specific integrated circuit (ASIC) chip, field programmable gate arrays (FPGAs), and a programmable logic device, which may perform any operation that is already well known or will be developed in the future.

At least part of an apparatus (for example, modules or functions) or method (for example, operations) according to various embodiments may be implemented by using instructions stored in a computer-readable storage media in the form of a programming module. When the instructions are executed by one or more processors, the one or more processors may perform a function corresponding to the instructions. The computer-readable storage media may be the memory 130, for example.

Examples of the computer-readable recording medium include hard disks, floppy disks, magnetic media (for example, magnetic tapes), optical media (for example, compact disc read only memories (CD-ROMs), digital versatile discs (DVDs), magneto-optical media (for example, floptical disks)), and hardware devices (for example, read only memories (ROMs), random access memories (RAMs) and flash memories). Examples of program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or programming module according to various embodiments may include one or more of the above-described elements, may omit some elements, or may further include additional other elements. The operations performed by the module, the programming module, or the other elements according to various embodiments may be performed serially, in parallel, repeatedly, or heuristically. In addition, some operation may be performed in different order or may be omitted, and additional other operations may be added.

Figure 4:
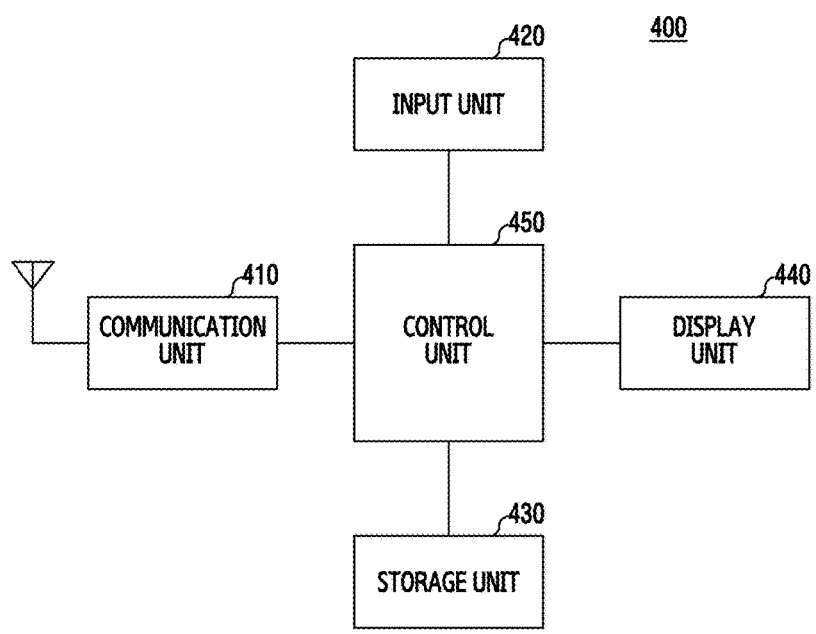
FIG. 4 is a block diagram illustrating an electronic device according to various embodiments of the present disclosure.

FIG. 4 is a block diagram illustrating an electronic device according to various embodiments of the present disclosure.

Referring to FIG. 4, the electronic device 400 includes a communication unit 410, an input unit 420, a storage unit 430, a display unit 440, and a control unit 450.

The communication unit 410 may perform communication in the electronic device 400. The communication unit 410 may communicate with an external device by using various communication methods. The communication unit 410 may perform at least one of wireless communication and wired communication. To achieve this, the communication unit 410 may connect to at least one of a mobile communication network and a data communication network. In addition or as an alternative, the communication unit 410 may perform short-distance communication. For example, the external device may include an electronic device, a base station, a server, and a satellite. In addition, the communication method may include long term evolution (LTE), wideband code division multiple access (WCDMA), global system for mobile communications (GSM), wireless fidelity (WiFi), Bluetooth, and near field communications (NFC).

The input unit 420 may generate input data in the electronic device 400. More specifically, the input unit 420 may generate input data in response to a user input to the electronic device 400. In addition, the input unit 420 may include at least one inputting means. The input unit 420 may include, for example, a key pad, a dome switch, a physical button, a touch panel, a jog & shuttle, and a sensor.

The storage unit 430 may store the operation programs of the electronic device 400. More specifically, the storage unit 430 may store programs for executing various functions.

The storage unit 430 may also store data that is generated while the programs are executed. The storage unit 430 may also store a plurality of icons. Herein, the respective icons may correspond to at least one of the functions. Some of the icons may be set as fixed icons and the other icons may be hidden icons. Herein, the fixed icons may be a pre-set number of icons, for example, eight icons. The fixed icons may be selected when the electronic device 400 is manufactured, according to the frequency of selection by the user of the electronic device 400, or by the user of the electronic device 400. Furthermore, the fixed icons may be converted into hidden icons, and the hidden icons may be converted into fixed icons.

The display unit 440 may output display data, which may include a background screen. The display unit 440 may include, for example, one or more of a liquid crystal display (LCD), a light emitting diode (LED) display, an organic LED (OLED) display, a micro electro mechanical system (MEMS) display, and an electronic paper display. Herein, the display unit 440 may be combined with the input unit 420 to be implemented as a touch screen.

The control unit 450 may control an overall operation in the electronic device 400. In this case, the control unit 450 may display a fixed window (first window) on the background screen when the background screen is displayed on the display unit 440. Herein, the control unit 450 may arrange the fixed icons in the fixed window. In addition, when a first movement request is detected, the control unit 450 may display a hidden window (second window) on the background screen. Herein, the control unit 450 may arrange the hidden icons in the hidden window. That is, the control unit 450 may display the hidden window along with the fixed window. In addition, when a second movement request is detected during the display of the hidden window, the control unit 450 may remove the hidden window from the background screen. Herein, the control unit 450 may remove the hidden icons from the background screen.

According to various embodiments of the present disclosure, an electronic device may include a display unit configured to display a background screen, and a control unit operatively connected to the display unit, and the control unit may be configured to display a first window including icons on the background screen, detect a movement request in one direction, move the first window in the one direction in the background screen, and display a second window including other icons on the background screen.

According to various embodiments of the present disclosure, the control unit may be configured to detect a movement request in another direction, remove the second window from the background screen, and move the first window in the other direction in the background screen.

According to various embodiments of the present disclosure, the control unit may be configured to detect a movement request in the other direction in the second window, and change pages of the second window while maintaining the first window on the background screen.

According to various embodiments of the present disclosure, the control unit may be configured to detect a movement request in the other direction in the background screen, and change pages of the background screen while maintaining the first window on the background screen.

According to various embodiments of the present disclosure, the control unit may be configured to detect another movement request in the one direction, move the first window in the one direction in the background screen, and extend the second window in the background screen.

According to various embodiments of the present disclosure, the control unit may be configured to detect a movement request in the other direction, reduce the second window in the background screen, and move the first window in the other direction in the background screen.

According to various embodiments of the present disclosure, the control unit may be configured to detect a movement request in the other direction, and set a lock in the background screen.

According to various embodiments of the present disclosure, the background screen may include at least one icon.

According to various embodiments of the present disclosure, the control unit may be configured to reduce the icon in the background screen while moving the first window in the one direction.

According to various embodiments of the present disclosure, the control unit may be configured to extend the icon in the background screen while moving the first window in the other direction.

Figure 5:
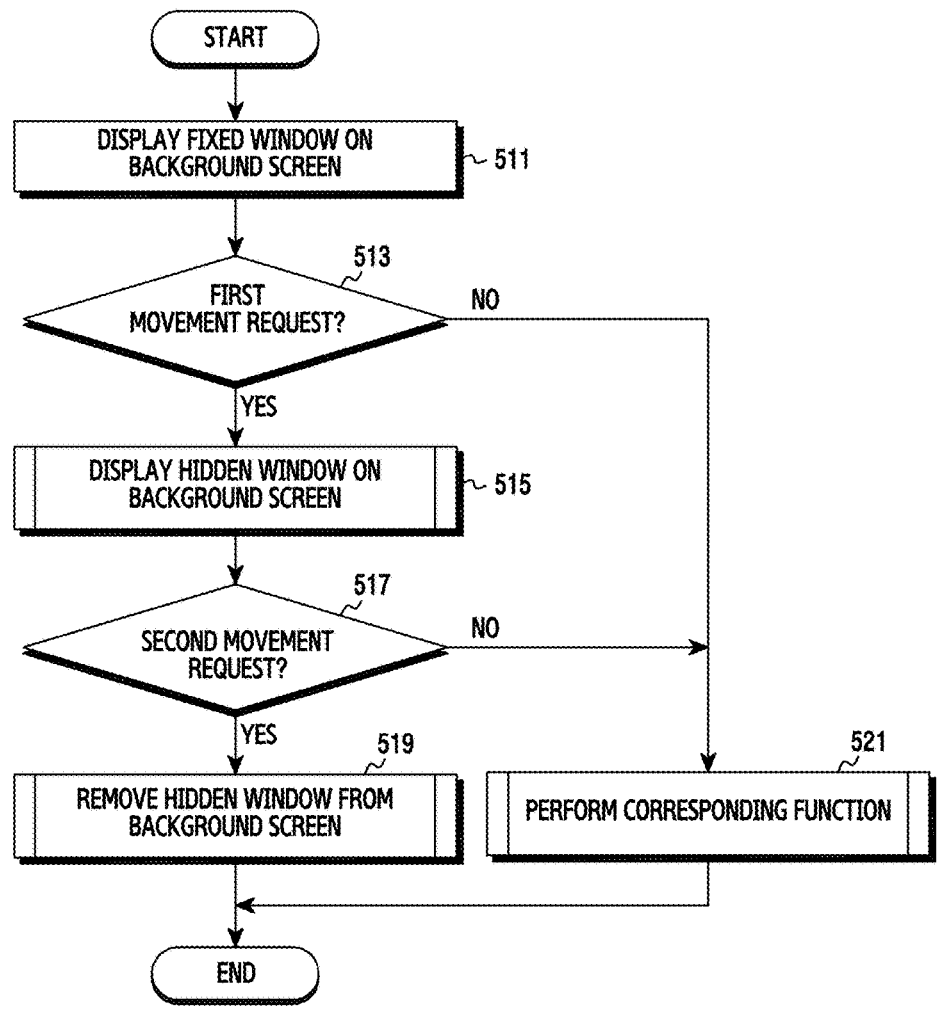
FIG. 5 is a flowchart illustrating a performance procedure of a screen display method according to various embodiments of the present disclosure.

FIG. 5 is a flowchart illustrating a performance procedure of a screen display method according to various embodiments of the present disclosure. In addition, FIGS. 10, 11, 12A, 12B, and 13 to 17 illustrate examples of screens displayed according to a screen display method according to various embodiments of the present disclosure.

Figure 10:
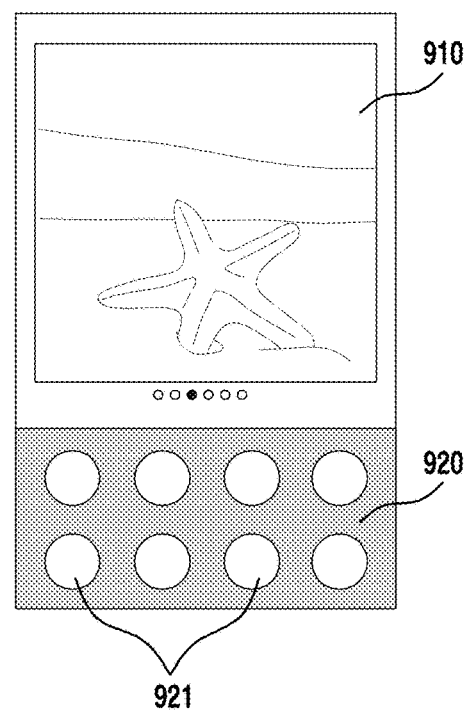
FIGS. 10, 11, 12A, 12B, and 13 to 17 are diagrams illustrating examples of screens displayed according to screen display methods according to various embodiments of the present disclosure.

Referring to FIGS. 4, 5, 10, and 11 according to embodiments of the present disclosure, the control unit 450 may display a fixed window 920 on a background screen 910 such as shown in FIG. 10, for example, in step 511. Herein, the control unit 450 may display the background screen 910 as a single page. Alternatively, the control unit 450 may display the background screen 910 as a plurality of pages. When the background screen 910 includes a plurality of pages, the control unit 450 may display the fixed window 920 on all of the pages of the background screen 910. In addition, the control unit 450 may display the fixed window 920 on a predetermined location of the background screen 910.

According to various embodiments of the present disclosure, the control unit 450 may display fixed icons 921 in the fixed window 920. In this case, the control unit 450 may arrange the fixed icons 921 in a single row and a plurality of columns in the fixed window 920, or may arrange the fixed icons 921 in a plurality of rows and a plurality of columns in the fixed window 920, such as shown in FIG. 10, for example. Herein, the fixed icons 921 may be stored in the storage unit 430. In addition, the fixed icons 921 may be a pre-set number of icons, for example, eight icons. The fixed icons 921 may be selected when the electronic device 400 is manufactured, according to the frequency of selection by the user of the electronic device 400, or by the user of the electronic device 400. In addition, the control unit 450 may display at least one widget on the background screen 910, and may display at least one icon on the background screen 910. For example, the control unit 450 may display at least one of the fixed icons 921 on the background screen 910, and may display at least one of the hidden icons 931 on the background screen 910.

Figure 16:
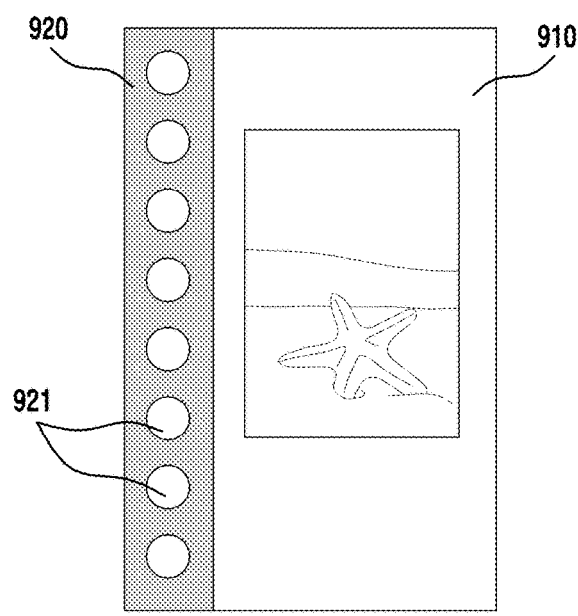

For example, as shown in FIG. 10, the control unit 450 may display the fixed window 920 on the lower end of the background screen 910. Alternatively, as shown in FIG. 16, the control unit 450 may display the fixed window 920 on one side end of the background screen 910. The control unit 450 may display the fixed window 920 on the right-side end or left-side end of the background screen 910. Herein, the control unit 450 may express the fixed icons 921 as images.

The control unit 450 may add identification data corresponding to the fixed icons 921 and express the identification data as texts.

According to various embodiments of the present disclosure, when a first movement request is made, the control unit 450 detects the first movement request in step 513. The first movement request may be made through the input unit 420. The first movement request may be made in one direction. In addition, the user of the electronic device 400 may identify the direction of the first movement request according to the location of the fixed window 920 on the background screen 910. Herein, the first movement request may be made in an upward direction or may be made in a leftward direction or a rightward direction, according to the fixed window 920. The first movement request may start in the fixed window 920. In addition, the input unit 420 and the display unit 440 may be implemented by using a touch screen, and the first movement request may be made by a swipe or a pre-defined gesture. In addition, when the first movement request is detected, the control unit 450 may calculate at least one of the location, distance, or speed of the first movement request.

Figure 11:
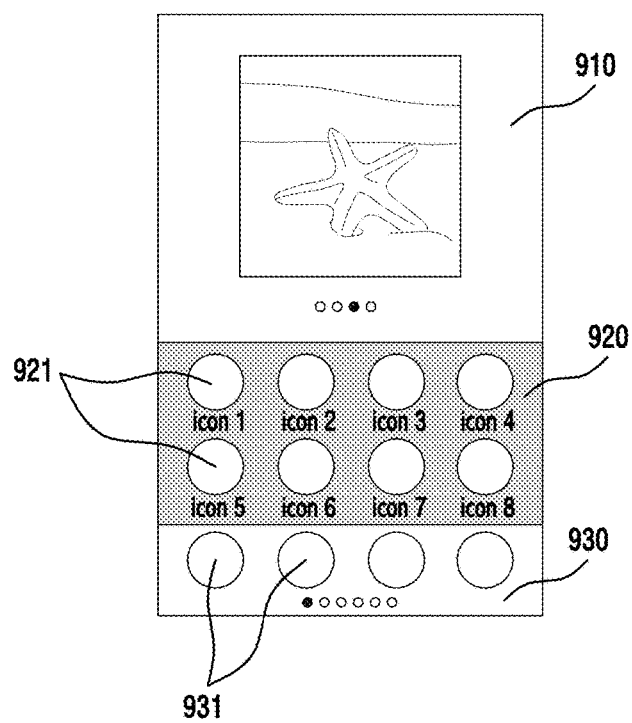

According to various embodiments of the present disclosure, the control unit 450 displays a hidden window 930 on the background screen 910, such as shown in FIG. 11, for example, in step 515. In addition, the control unit 450 may display hidden icons 931 in the hidden window 930. In this case, the hidden icons 931 may be stored in the storage unit 430. Herein, the control unit 450 may display the hidden window 930 on the background screen 910 according to at least one of the location, distance, or speed of the first movement request.

Figure 6:
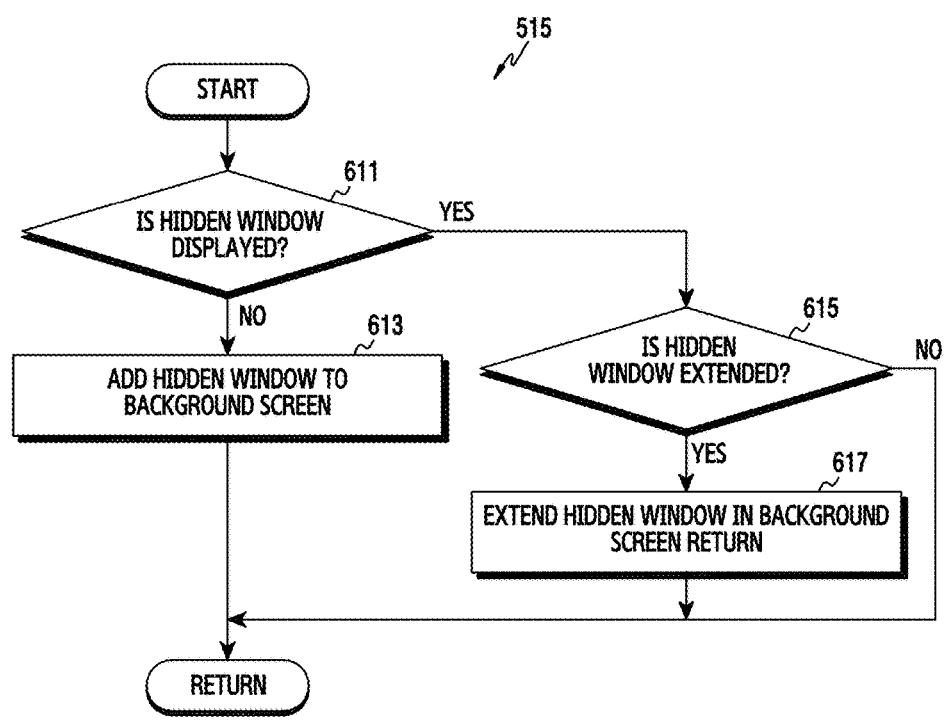
FIG. 6 is a sequence diagram illustrating a performance procedure of a hidden window displaying operation in FIG. 5 according to various embodiments of the present disclosure.

FIG. 6 is a sequence diagram illustrating a performance procedure of a hidden window displaying operation in FIG. 5 according to an embodiment of the present disclosure.

Referring to FIG. 6, according to various embodiments of the present disclosure, the control unit 450 determines whether the hidden window 930 is displayed, in step 611. For example, the control unit 450 may determine whether the hidden window 930 is displayed in response to the first movement request.

According to various embodiments of the present disclosure, when it is determined that the hidden window 930 is not displayed on the background screen 910 in step 611, the control unit 450 adds the hidden window 930 to the background screen 910, in step 613. For example, the control unit 450 may add the hidden window 930 to the background screen 910 while continuously displaying the fixed window 920 on the background screen 910. The control unit 450 may move the fixed window 920 in one direction on the background screen 910. In addition, the control unit 450 may add the hidden window 930 to the fixed window 920 on the background screen 910.

According to various embodiments of the present disclosure, the control unit 450 may display the hidden icons 931 in the hidden window 930. Herein, the control unit 450 may display the hidden window 930 as a single page. Alternatively, the control unit 450 may display the hidden window 930 as a plurality of pages, and arrange the hidden icons 931 to disperse over the pages of the hidden window 930. In addition, the control unit 450 may arrange the hidden icons 931 in a single row and a plurality of columns in the hidden window 930, or may arrange the hidden icons 931 in a plurality of rows and a plurality of columns in the hidden window 930.

Figure 17:
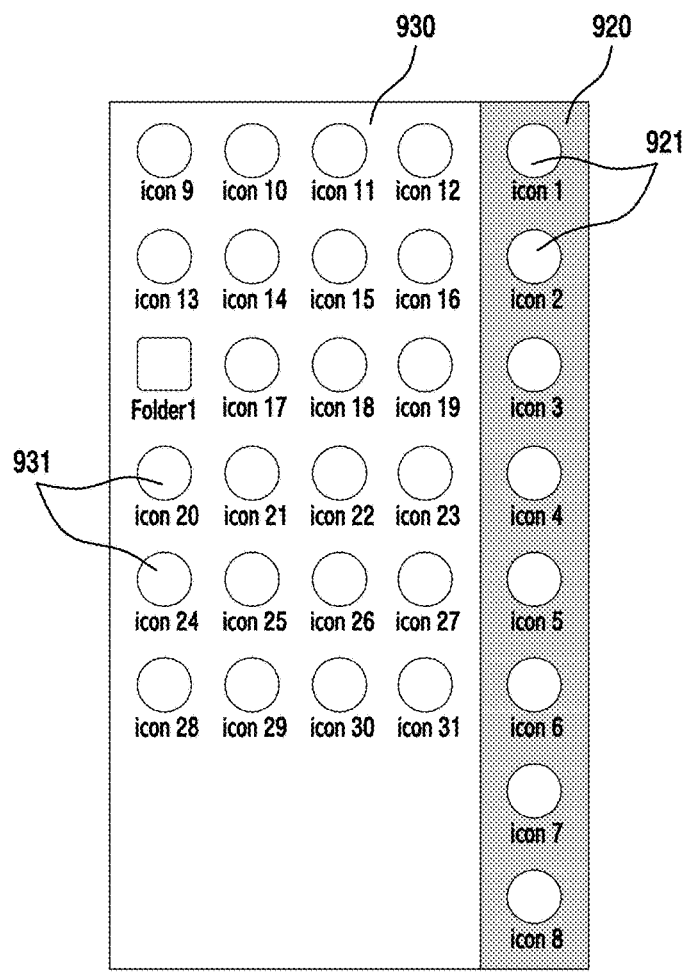

For example, when the fixed window 920 is displayed on the lower end of the background screen 910, as shown in FIG. 10, the control unit 450 may move the fixed window 920 up and display the hidden window 930 under the fixed window 920, as shown in FIG. 11. Herein, the control unit 450 may reduce the background screen 910. Alternatively, when the fixed window 920 is displayed on the lower end of the background screen 910 as shown in FIG. 10, the control unit 450 may move the fixed window 920 to the right-side end or left-side end of the background screen 910, and display the hidden window 930 on the right or left of the fixed window 920 as shown in FIG. 17. According to various embodiments of the present disclosure, the control unit 450 may extend the background screen 910. Alternatively, when the fixed window 920 is displayed on one side end of the background screen 910, as shown in FIG. 16, the control unit 450 may move the fixed window 920 to the other side end of the background screen 910, and display the hidden window 930 on the right or left of the fixed window 920, as shown in FIG. 17. Herein, the control unit 450 may maintain the background screen 910. Furthermore, when the fixed icons 921 are expressed as images, the control unit 450 may add identification data corresponding to the fixed icons 921 and express the identification data as texts. The control unit 450 may express the hidden icons 931 as images. The control unit 450 may add identification data corresponding to the hidden icons 931 and express the identification data as texts.

According to various embodiments of the present disclosure, when it is determined that the hidden window 930 is displayed in step 611, the control unit 450 determines whether to extend the hidden window 930, in step 615. For example, the control unit 450 may determine whether there is a space for displaying the hidden window 930 in the background screen 910. Herein, when there is a space for displaying the hidden window 930 in the background screen 910, the control unit 450 may determine that it is possible to extend the hidden window 930. However, where there is no space for displaying the hidden window 930 in the background screen 910, the control unit 450 may determine that it is impossible to extend the hidden window 930.

According to various embodiments of the present disclosure, when the hidden window 930 is determined to be extended in step 615, the control unit 450 extends the hidden window 930 in the background screen 910, in step 617. For example, the control unit 450 may extend the hidden window 930 in the background screen 910 while continuously displaying the fixed window 920 on the background screen 910. The control unit 450 may move the fixed window 920 in one direction in the background screen 910. In addition, the control unit 450 may extend the hidden window 930 onto the fixed window 920 in the background screen 910. Herein, when the hidden window 930 is extended, the widget or icon in the background screen 910 may gradually become blurred and may be reduced. In addition, when the fixed icons 921 or hidden icons 931 are expressed as images, the control unit 450 may add identification data corresponding to the fixed icons 921 or the hidden icons 931 and express the identification data as texts.

In addition, the control unit 450 may add the hidden icons 931 to the hidden window 930. Herein, the control unit 450 may display the hidden window 930 as a single page. Alternatively, the control unit 450 may display the hidden window 930 as a plurality of pages, and may arrange the hidden icons 931 to disperse over the pages of the hidden window 930. In addition, the control unit 450 may arrange the hidden icons 931 in a plurality of rows and a plurality of columns in the hidden window 930.

For example, when the hidden window 930 is displayed as shown in FIG. 11, the control unit 450 may extend the hidden window 930 as shown in FIG. 12A or 12B. More specifically, the control unit 450 may maintain the fixed window 920 as shown in FIG. 12A. Alternatively, the control unit 450 may reduce the fixed window 920 and reduce the fixed icons 921 as shown in FIG. 12B. In addition, when the hidden window 930 is displayed as shown in FIG. 12A, the control unit 450 may extend the hidden window 930 as shown in FIG. 12B or FIG. 13. Herein, the control unit 450 may display a part of the background screen 910. Alternatively, the control unit 450 may cover the entire background screen 910 with the fixed window 920 and the hidden window 930, as shown in FIG. 13. In addition, when the hidden window 930 is displayed as shown in FIG. 12B or FIG. 13, the control unit 450 may extend the hidden window 930 as shown in FIG. 14. For example, the control unit 450 may remove the fixed icons 921 from the fixed window 920, and display a button 925 in the fixed window 920, as shown in FIG. 14. Alternatively, the control unit 450 may remove some of the fixed icons 921 from the fixed window 920.

According to various embodiments of the present disclosure, the control unit 450 returns to the procedure of FIG. 5 after adding the hidden window 930 to the background screen 910, in step 613. Alternatively, the control unit 450 may return to the procedure of FIG. 5 after extending the hidden window 930 in the background screen 910 in step 617. The control unit 450 also returns to the procedure of FIG. 5 when the hidden window 930 is determined not to be extended, in step 615.

According to various embodiments of the present disclosure, when a second movement request is made while the hidden window 930 is displayed, the control unit 450 detects the second movement request in step 517. For example, the second movement request may be made through the input unit 420. The second movement request may be made in the other direction (e.g., a direction opposite or substantially opposite to the direction corresponding to the first movement request). Herein, when a direction is referred to as "opposite" to another direction, the opposite direction may be directly or substantially opposite to the other direction. The user of the electronic device 400 may identify the direction of the second movement request according to an arrangement relationship between the fixed window 920 and the hidden window 930 in the background screen 910. Herein, the second movement request may be made in a downward direction or in a leftward or rightward direction according to the location of the fixed window 920. The second movement request may start in the fixed window 920. The input unit 420 and the display unit 440 may be implemented by using a touch screen, and the second movement request may be made by a user gesture (for example, a swipe). In addition, when the second movement request is detected, the control unit 450 may calculate at least one of the location, distance or speed of the second movement request. Thereafter, the control unit 450 may remove the hidden window 930 from the background screen 910 in step 519. Herein, the control unit 450 may remove the hidden window 930 from the background screen 910 according to at least one of the location, distance, or speed of the second movement request.

Figure 7:
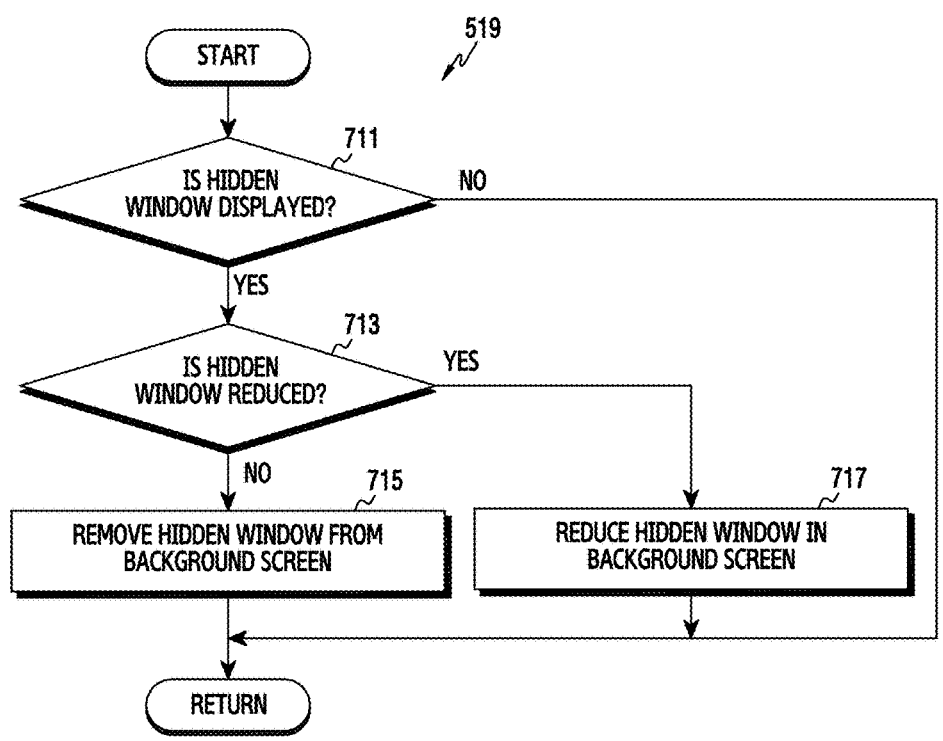
FIG. 7 is a sequence diagram illustrating a performance procedure of a hidden window removing operation in FIG. 5 according to various embodiments of the present disclosure.

FIG. 7 is a sequence diagram illustrating a performance procedure of a hidden window removing operation in FIG. 5 according to various embodiments of the present disclosure.

Referring to FIG. 7, the control unit 450 determines whether the hidden window 930 is displayed, in step 711. For example, the control unit 450 may determine whether the hidden window 930 is displayed, in response to the second movement request.

According to various embodiments of the present disclosure, when it is determined that the hidden window 930 is displayed in step 711, the control unit 450 determines whether to reduce the hidden window 930, in step 713. For example, the control unit 450 may determine whether the hidden window 930 is extended. Herein, when the hidden window 930 is extended, the control unit 450 may determine that it is possible to reduce the hidden window 930. However, when the hidden window 930 is not extended, the control unit 450 may determine that it is impossible to reduce the hidden window 930.

According to various embodiments of the present disclosure, when the hidden window 930 is determined to be not reduced, in step 713, the control unit 450 removes the hidden window 930 from the background screen 910 in step 715. More specifically, the control unit 450 may remove the hidden window 930 from the background screen 910 while continuously displaying the fixed window 920 on the background screen 910. More specifically, the control unit 450 may remove the hidden icons 931 from the background screen 910. In addition, the control unit 450 may move the fixed window 920 in the other direction in the background screen 910. Herein, the control unit 450 may move the fixed window 920 to the lower end of the background screen 910.

For example, when the hidden window 930 is displayed on the background screen 910 as shown in FIG. 11, the control unit 450 may remove the hidden window 930 from the background screen 910 as shown in FIG. 10. Alternatively, when the hidden window 930 is displayed on the background screen 910 as shown in FIG. 17, the control unit 450 may remove the hidden window 930 from the background screen 910 as shown in FIG. 16.

According to various embodiments of the present disclosure, when the hidden window 930 is determined to be reduced in step 713, the control unit 450 reduces the hidden window 930 in the background screen 910, in step 717.

Figure 12:
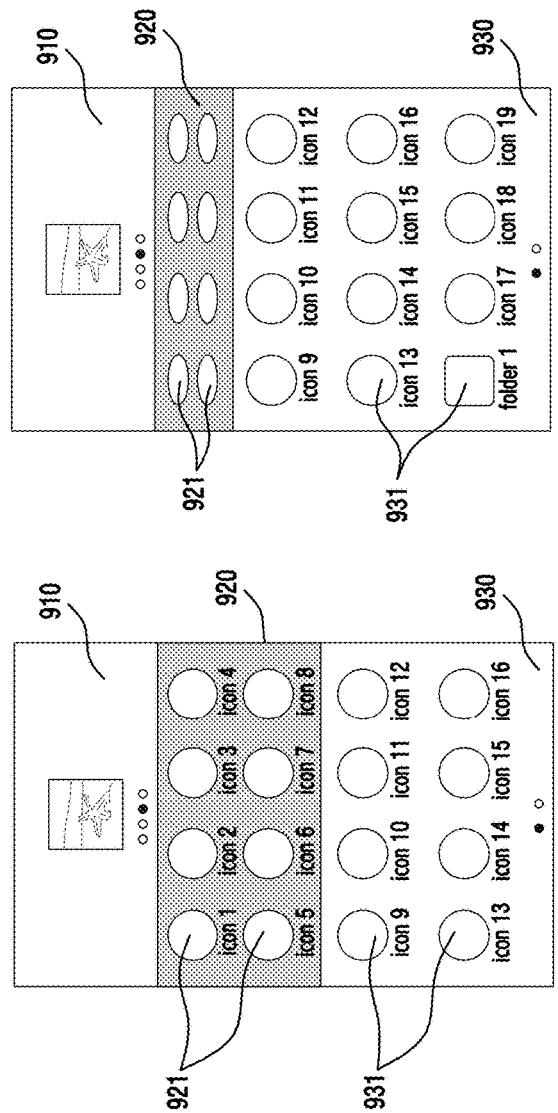
Figure 13:
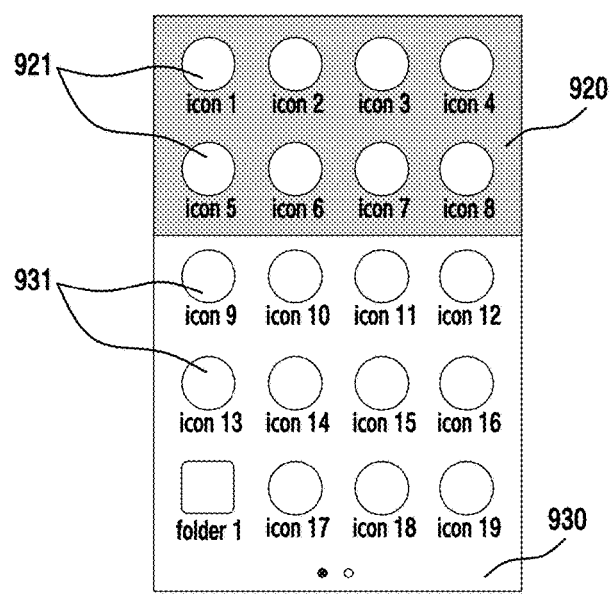
Figure 14:
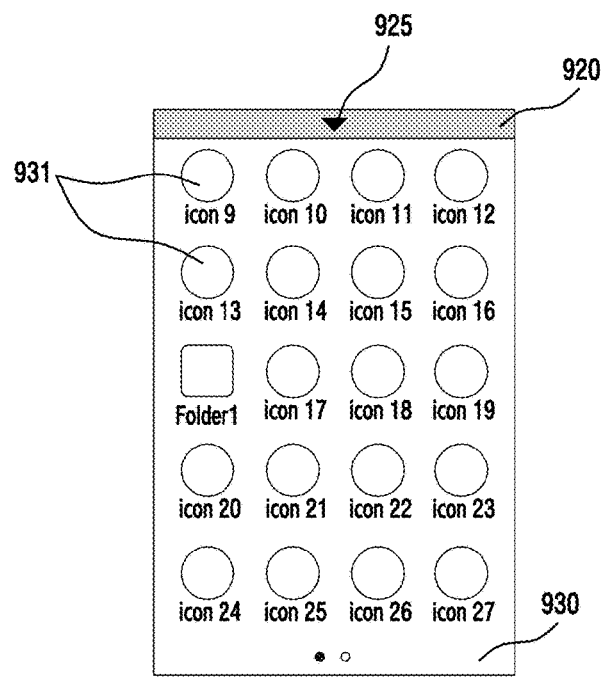

For example, when the hidden window 930 is displayed as shown in FIG. 12A or 12B, 13, or 14, the control unit 450 may reduce the hidden window 930 as shown in FIG. 11, 12, or 13, respectively. More specifically, the control unit 450 may reduce the hidden window 930 in the background screen 910 while continuously displaying the fixed window 920 on the background screen 910. In addition, the control unit 450 may move the fixed window 920 in the other direction in the background screen 910. Herein, when the hidden window 930 is reduced, the widget or icon on the background screen 910 may gradually become distinct and may be magnified. Furthermore, when the fixed icons 921 or the hidden icons 923 are expressed as images and texts, the control unit 450 may remove the texts corresponding to the fixed icons 921 or the hidden icons 923.

According to various embodiments of the present disclosure, the control unit 450 may reduce and display the hidden icons 931 in the hidden window 930. Herein, the control unit 450 may display the hidden window 930 as a single page. Alternatively, the control unit 450 may display the hidden window 930 as a plurality of pages, and arrange the hidden icons 931 to disperse over the pages of the hidden window 930. In addition, the control unit 450 may arrange the hidden icons 931 in a single row and a plurality of columns in the hidden window 930, or may arrange the hidden icons 931 in a plurality of rows and a plurality of columns in the hidden window 930.

For example, when the hidden window 930 is displayed as shown in FIG. 12A or 12B, the control unit 450 may reduce the hidden window 930, as shown in FIG. 11. Herein, the control unit 450 may maintain the fixed window 920. Alternatively, the control unit 450 may extend the fixed window 920 and extend the fixed icons 921. In addition, when the hidden window 930 is displayed as shown in FIG. 13, the control unit 450 may reduce the hidden window 930 as shown in FIG. 12A or 12B. Herein, the control unit 450 may display a part of the background screen 910. In addition, the control unit 450 may reduce the fixed window 920 and may reduce the fixed icons 921 as shown in FIG. 12B. In addition, when the hidden window 930 is displayed as shown in FIG. 14, the control unit 450 may reduce the hidden window 930 as shown in FIG. 13. Herein, the control unit 450 may remove the button 925 from the fixed window 920 and display the fixed icons 921 in the fixed window 920.

According various embodiments of the present disclosure, the control unit 450 returns to the procedure of FIG. 5 after removing the hidden window 930 from the background screen 910, in step 715. Alternatively, the control unit 450 returns to the procedure of FIG. 5 after reducing the hidden window 930 in the background screen 910, in step 717. Alternatively, when it is determined that the hidden window 930 is not displayed in step 711, the control unit 450 returns to the procedure of FIG. 5.

According to various embodiments of the present disclosure, when the first movement request is not detected in step 513 or the second movement request is not detected in step 517, the control unit 450 performs a corresponding function in step 521. For example, the control unit 450 may select one of the fixed icons 921 in the fixed window 920, and execute a corresponding function. Alternatively, the control unit 450 may select one of the hidden icons 931 in the hidden window 930, and execute a corresponding function. Alternatively, the control unit 450 may mutually convert the fixed icons 921 into hidden icons and the hidden icons 931 into fixed icons. Alternatively, the control unit 450 may change the pages in the hidden window 930, and may change the pages in the background screen 910. Alternatively, the control unit 450 may set a lock in the background screen 910.

Figure 8:
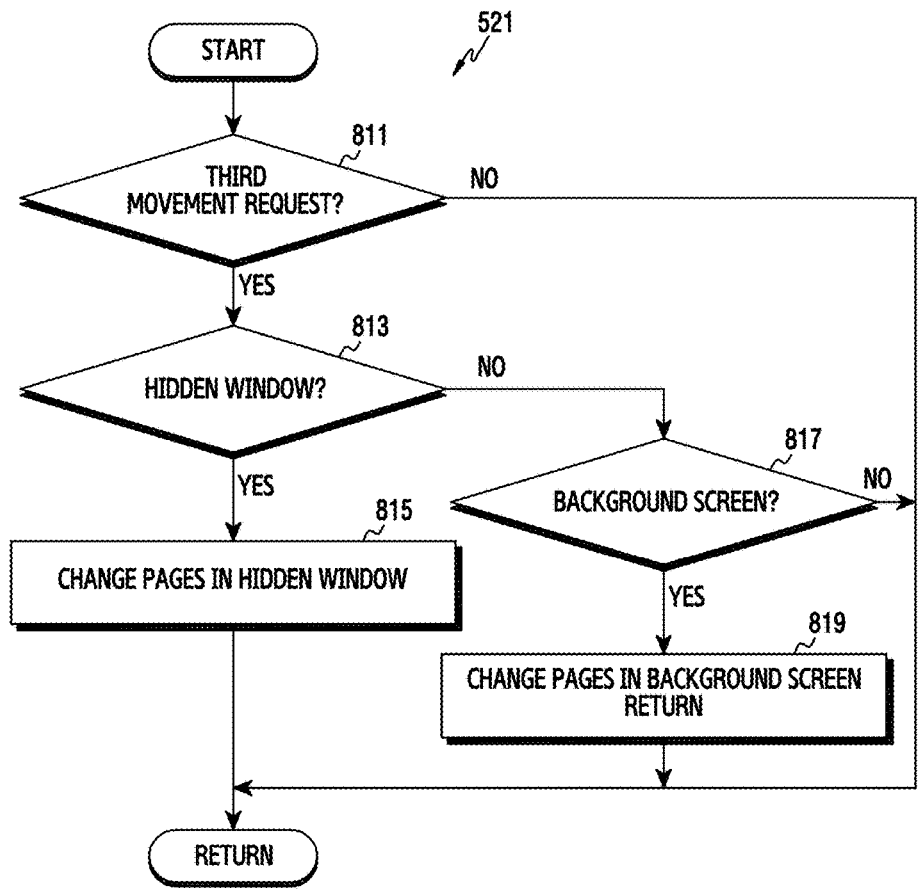
FIGS. 8 and 9 are sequence diagrams illustrating a performance procedure of a corresponding function performing operation in FIG. 5 according to various embodiments of the present disclosure.
Figure 9:
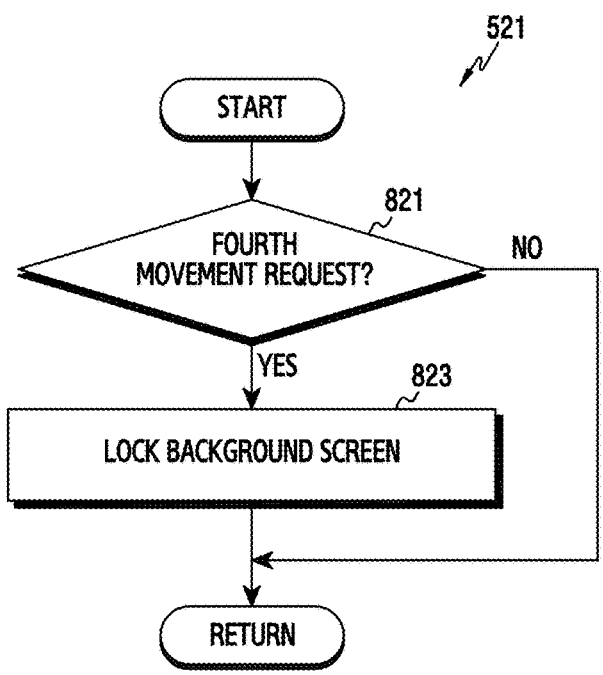

FIGS. 8 and 9 are sequence diagrams illustrating a performance procedure of a corresponding function performing operation in FIG. 5 according to various embodiments of the present disclosure. In this case, FIG. 8 illustrates a page change function performance procedure, and FIG. 9 illustrates a background screen locking function.

Referring to FIG. 8, according to various embodiments of the present disclosure, when a third movement request is made, the control unit 450 detects the third movement request, in step 811. For example, the third movement request may be made through the input unit 420. In addition, the third movement request may be made in the other direction (e.g., a direction opposite or substantially opposite to the direction corresponding to the first movement request, and the same as the other direction corresponding to the second movement request). Herein, the third movement request may be made in a horizontal direction or a vertical direction, i.e., in a leftward or rightward direction. In addition, the input unit 420 and the display unit 440 may be implemented by using a touch screen, and the third movement request may be made by a user gesture (for example, a swipe). In addition, when the third movement request is detected, the control unit 450 may calculate at least one of the location, distance, or speed of the third movement request.

According to various embodiments of the present disclosure, the control unit 450 determines whether the third movement request is made in the hidden window 930, in step 813. Herein, the control unit 450 may determine whether the third movement request is made in the hidden window 930 according to the location of the third movement request.

Figure 15:
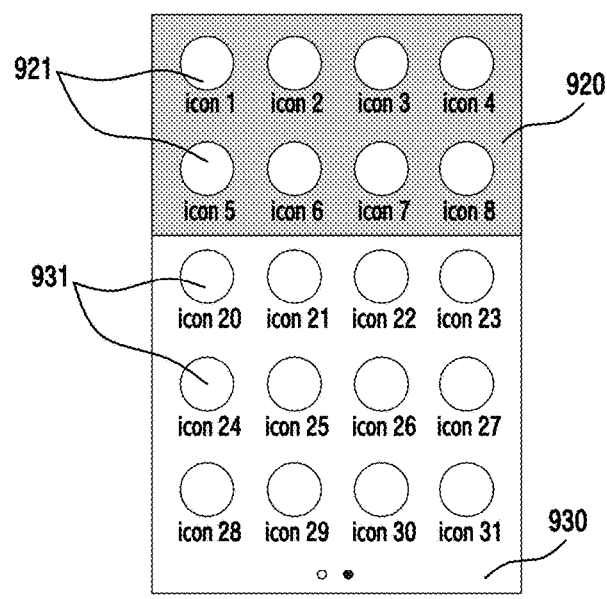

According to various embodiments of the present disclosure, when it is determined that the third movement request is made in the hidden window 930, in step 813, the control unit 450 changes the pages in the hidden window 930, in step 815. For example, when the hidden window 930 is displayed as shown in FIG. 13, the control unit 450 may change the pages in the hidden window 930 as shown in FIG. 15. In addition, the control unit 450 may continuously display the fixed window 920 on the background screen 910. That is, even when the pages are changed in the hidden window 930, the control unit 450 may continuously display the fixed window 920. Herein, the control unit 450 may change the pages in the hidden window 930 according to at least one of the distance or speed of the third movement request.

According to various embodiments of the present disclosure, when it is determined that the third movement request is not made in the hidden window 930, in step 813, the control unit 450 determines whether the third movement request is made in the background screen 910, in step 817. Herein, the control unit 450 may determine whether the third movement request is made in the background screen 910 according to the location of the third movement request.

According to various embodiments of the present disclosure, when it is determined that the third movement request is made in the background screen 910 in step 817, the control unit 450 changes the pages in the background screen 910, in step 819. For example, the control unit 450 may continuously display the fixed window 920 in all of the pages of the background screen 910. That is, even when the pages are changed in the background screen 910, the control unit 450 may continuously display the fixed window 920. Herein, the control unit 450 may change the pages in the background screen 910 according to at least one of the distance or speed of the third movement request.

According to various embodiments of the present disclosure, the control unit 450 may return to the procedure of FIG. 5 after changing the pages in the hidden window 930 in step 815. Alternatively, the control unit 450 may return to the procedure of FIG. 5 after changing the pages in the background screen 910 in step 819. However, when the third movement request is not detected in step 811, the control unit 450 returns to the procedure of FIG. 5. Also, when it is determined that the third movement request is not made in the background screen 910, in step 817, the control unit 450 returns to the procedure of FIG. 5.

Referring to FIG. 9, according to various embodiments of the present disclosure, when a fourth movement request is made, the control unit 450 detects the fourth movement request, in step 821. In this case, the fourth movement request may be made through the input unit 420. In addition, the fourth movement request may be made in the other direction (e.g., a direction opposite or substantially opposite to the direction corresponding to the first movement request, and the same as the other direction corresponding to the second and third movement requests). Herein, the fourth movement request may be made in a downward direction or in a leftward or right ward direction according to the fixed window 920. In addition, the fourth movement request may start in the fixed window 920. In addition, the input unit 420 and the display unit 440 may be implemented by using a touch screen, and the fourth movement request may be made by a user gesture (for example, a swipe). In addition, when the fourth movement request is detected, the control unit 450 may calculate at least one of the location, distance, or speed of the fourth movement request.

According to various embodiments of the present disclosure, the control unit 450 may set a lock in the background screen 910 in step 823. In this case, the control unit 450 may activate a locking function on the display unit 440. Alternatively, the control unit 450 may not display the background screen 910 and may display an unlocking screen.

According to various embodiments of the present disclosure, the electronic device 400 may display the fixed icons on the background screen, and also, may display the hidden icons according to a user's request. Accordingly, the user of the electronic device 400 can easily access the icon that the user desires. Furthermore, the user of the electronic device 400 can easily toggle between the fixed icons and the hidden icons on a single screen, that is, on the background screen.

According to various embodiments of the present disclosure, a method of an electronic device may include: displaying a first window including icons on a background screen; detecting a movement request in one direction; moving the first window in the one direction in the background screen; and adding and displaying a second window including other icons on the background screen.

According to various embodiments of the present disclosure, the method may further include: detecting a movement request in the other direction; removing the second window from the background screen; and moving the first window in the other direction in the background screen.

According to various embodiments of the present disclosure, the method may further include: detecting a movement request in the other direction in the second window; and changing pages of the second window while maintaining the first window on the background screen.

According to various embodiments of the present disclosure, the method may further include: detecting a movement request in the other direction in the background screen; and changing pages of the background screen while maintaining the first window on the background screen.

According to various embodiments of the present disclosure, the method may further include: detecting another movement request in the one direction; moving the first window in the one direction in the background screen; and extending the second window in the background screen.

According to various embodiments of the present disclosure, the method may further include: detecting a movement request in the other direction; reducing the second window in the background screen; and moving the first window in the other direction in the background screen.

According to various embodiments of the present disclosure, the method may further include: detecting a movement request in the other direction; and setting a lock in the background screen.

According to various embodiments of the present disclosure, the background screen may include at least one icon.

According to various embodiments of the present disclosure, the moving the first window in the one direction may further include reducing the icon in the background screen.

According to various embodiments of the present disclosure, the moving the second window in the other direction may further include extending the icon in the background screen.

Screen display apparatuses and methods according to various embodiments of the present disclosure can display fixed icons on the background screen of the electronic device, and also, can display hidden icons according to a user's request. Therefore, a user of the electronic device can easily access desired icons, the user of the electronic device can easily toggle between the fixed icons and the hidden icons on a single screen (e.g., on a background screen).

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of an electronic device, comprising:
   displaying a first window including a first set of at least one icon on a background screen;
   detecting a first user input in a first direction while displaying the first window; and
   moving, based on the first user input, the first window in the first direction in the background screen; and
   displaying, the moved first window and a second window on the background, the second window including a second set of at least one icon and being displayed below the moved first window on the background screen.

2. The method of claim 1, further comprising:
   detecting a second user input in a second direction;
   removing, based on the second user input, the second window from the background screen; and
   moving the first window in the second direction in the background screen.

3. The method of claim 1, further comprising:
   detecting a third user input in a third direction in the second window; and
   changing, based on the third user input, pages of the second window while maintaining the first window on the background screen.

4. The method of claim 1, further comprising:
   detecting, a fourth user input in a third direction in the background screen; and
   changing, based on the fourth user input, pages of the background screen while maintaining the first window on the background screen.

5. The method of claim 1, further comprising:
   detecting, a fifth user input in the first direction; and
   moving, based on the fifth user input, the first window in the first direction in the background screen and extending the second window in the background screen.

6. The method of claim 5, further comprising:
   detecting, a sixth user input in a second direction; and
   reducing, based on the sixth user input, the second window in the background screen and moving the first window in the second direction in the background screen.

7. The method of claim 1, further comprising:
   detecting, a seventh user input in a fourth direction; and
   setting, based on the seventh user input, a lock in the background screen.

8. The method of claim 2, wherein the background screen includes at least one icon.

9. The method of claim 8, wherein the moving the first window in the first direction comprises further reducing the at least one icon included in the background screen.

10. The method of claim 8, wherein the moving the first window in the second direction comprises extending the at least one icon included in the background screen.

11. An electronic device comprising:
a display unit; and
a control unit operatively connected to the display unit, wherein the control unit is configured to:
control the display unit to display a first window including a first set of at least one icon on the background screen,
detect a first user input in a first direction while displaying the first window, and
move, based on the first user input, the first window in the one direction in the background screen, and
control the display unit to display the moved first window and a second window on the background screen, the second window including a second set of at least one icon and being displayed below the moved first window on the background screen.

12. The electronic device of claim 11, wherein the control unit is configured to:
detect a second user input in a second direction,
remove, based on the second user input, the second window from the background screen, and
move the first window in the second direction in the background screen.

13. The electronic device of claim 11, wherein the control unit is configured to:
detect a third user input a third direction in the second window, and
change, based on the third user input, pages of the second window while maintaining the first window on the background screen.

14. The electronic device of claim 11, wherein the control unit is configured to:
detect a fourth user input in a third direction in the background screen, and
change, based on the fourth user input, pages of the background screen while maintaining the first window on the background screen.

15. The electronic device of claim 11, wherein the control unit is configured to:
detect a fifth user input in the first direction,
move, based on the fifth user input, the first window in the first direction in the background screen and extend the second window in the background screen.

16. The electronic device of claim 15, wherein the control unit is further configured to:
detect a sixth user input in a second direction, and
reduce, based on the sixth user input, the second window in the background screen and move the first window in the second direction in the background screen.

17. The electronic device of claim 11, wherein the control unit is configured to:
detect a seventh user input in a fourth direction, and
set, based on the seventh user input, a lock in the background screen.

18. The electronic device of claim 12, wherein the background screen includes at least one icon.

19. The electronic device of claim 18, wherein the control unit is further configured to reduce the at least icon included in the background screen while moving the first window in the first direction.

20. The electronic device of claim 18, wherein the control unit is configured to extend the icon included in the background screen while moving the first window in the second direction.

* * * * *